US009727301B2

(12) United States Patent
Sweet

(10) Patent No.: US 9,727,301 B2
(45) Date of Patent: Aug. 8, 2017

(54) GESTURE-BASED PRIORITIZATION OF GRAPHICAL OUTPUT ON REMOTE DISPLAYS

(75) Inventor: Michael R. Sweet, Morgan Hill, CA (US)

(73) Assignee: APPLE INC., Cupertino, CA (US)

(*) Notice: Subject to any disclaimer, the term of this patent is extended or adjusted under 35 U.S.C. 154(b) by 496 days.

(21) Appl. No.: 13/153,220

(22) Filed: Jun. 3, 2011

(65) Prior Publication Data
US 2012/0306737 A1 Dec. 6, 2012

(51) Int. Cl.
G06F 15/16 (2006.01)
G06F 3/14 (2006.01)

(52) U.S. Cl.
CPC ..... *G06F 3/1454* (2013.01); *G09G 2340/045* (2013.01); *G09G 2340/0407* (2013.01); *G09G 2350/00* (2013.01); *G09G 2354/00* (2013.01)

(58) Field of Classification Search
CPC .......... G06F 3/1454; G09G 2340/0407; G09G 2354/00; G09G 2350/00; G09G 2340/045
USPC ......... 709/206, 232, 240; 715/718, 740, 864
See application file for complete search history.

(56) References Cited

U.S. PATENT DOCUMENTS

2002/0120753 A1* 8/2002 Levanon et al. ............. 709/228
2002/0196378 A1* 12/2002 Slobodin et al. ............ 348/744
2003/0041106 A1* 2/2003 Tuli ............................. 709/203
2004/0139208 A1* 7/2004 Tuli ............................. 709/230
2009/0132636 A1* 5/2009 Natanzon et al. ........... 709/201
2010/0026608 A1* 2/2010 Adams et al. ................ 345/2.1
2012/0266079 A1* 10/2012 Lee .................. G06F 17/30283
715/744

OTHER PUBLICATIONS

Crumley (Crumley, Project a PPT Show & See Notes on Your Laptop, Duke Center for Instructional Technology, Oct. 6, 2010, retrieved on Jan. 11, 2016 from https://cit.duke.edu/blog/2010/10/project-a-ppt-show-see-notes-on-your-laptop/).*

* cited by examiner

*Primary Examiner* — Tauqir Hussain
*Assistant Examiner* — Michael A Keller
(74) *Attorney, Agent, or Firm* — DLA Piper LLP (US)

(57) ABSTRACT

The disclosed embodiments provide a system that drives a remote display from an electronic device. The electronic may be a mobile phone, a tablet computer, a personal digital assistant (PDA), and/or a portable media player. During operation, the system uses the electronic device to obtain user input associated with a transition in graphical output on the electronic device and the remote display. Next, the system identifies a region of interest in the remote display based on the user input and a usage context associated with the graphical output. Finally, the system facilitates viewing of the transition on the remote display by prioritizing transmission of the graphical output from the electronic device to the remote display based on the region of interest.

26 Claims, 4 Drawing Sheets

GESTURE-BASED PRIORITIZATION OF GRAPHICAL OUTPUT ON REMOTE DISPLAYS

BACKGROUND

Field

The present embodiments relate to techniques for driving remote displays. More specifically, the present embodiments relate to gesture-based prioritization of graphical output on remote displays.

Related Art

Modern portable electronic devices typically include functionality to create, store, open, and/or update various forms of digital media. For example, a mobile phone may include a camera for capturing images, memory in which images may be stored, software for viewing images, and/or software for editing images. Moreover, the portability and convenience associated with portable electronic devices allows users of the portable electronic devices to incorporate digital media into everyday activities. For example, the camera on a mobile phone may allow a user of the mobile phone to take pictures at various times and in multiple settings, while the display screen on the mobile phone and installed software may allow the user to display the pictures to others.

However, size and resource limitations may prevent users of portable electronic devices from effectively sharing media on the portable electronic devices. For example, the display screen on a tablet computer may be too small to be used in a presentation to a large group of people. Instead, the user of the tablet computer may conduct the presentation by driving a large remote display using a screen-sharing application on the tablet computer.

At the same time, the driving of remote displays from portable electronic devices may be affected by bandwidth constraints between the portable electronic device and the remote display. For example, a low-bandwidth wireless connection between a tablet computer and a remote display may prevent the tablet computer from transmitting full-resolution screen updates of a presentation to the remote display at the frame rate used to drive the remote display. As a result, the tablet computer may be required to reduce the frame rate at which the remote display is driven and/or the resolution of frame updates to the remote display. In turn, the reduced frame rate and/or resolution of the frame updates may adversely affect the viewing experience of the presentation on the remote display.

Hence, what is needed is a mechanism for facilitating the driving of a remote display from a portable electronic device.

SUMMARY

The disclosed embodiments provide a system that drives a remote display from an electronic device. The electronic may be a mobile phone, a tablet computer, a personal digital assistant (PDA), and/or a portable media player. During operation, the system uses the electronic device to obtain user input associated with a transition in graphical output on the electronic device and the remote display. Next, the system identifies a region of interest in the remote display based on the user input and a usage context associated with the graphical output. Finally, the system facilitates viewing of the transition on the remote display by prioritizing transmission of the graphical output from the electronic device to the remote display based on the region of interest.

In some embodiments, identifying the region of interest based on the user input and the usage context involves identifying the transition based on the user input and the usage context, and obtaining the region of interest as a portion of the remote display associated with the transition.

In some embodiments, the portion of the remote display is at least one of:
(i) an edge of the remote display;
(ii) a center of the remote display;
(iii) a border of the remote display; and
(iv) a block of pixels in the remote display.

In some embodiments, the transition corresponds to at least one of a translation, a rotation, a scaling, and a fading effect.

In some embodiments, the user input is at least one of a tapping gesture, a swiping gesture, a pinching gesture, and a rotating gesture.

In some embodiments, prioritizing transmission of the graphical output from the electronic device to the remote display based on the region of interest involves transmitting a first set of pixel values for the region of interest to the remote display prior to transmitting a second set of pixel values for a remainder of the remote display to the remote display.

In some embodiments, the first set of pixel values is associated with a higher resolution than the second set of pixels.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
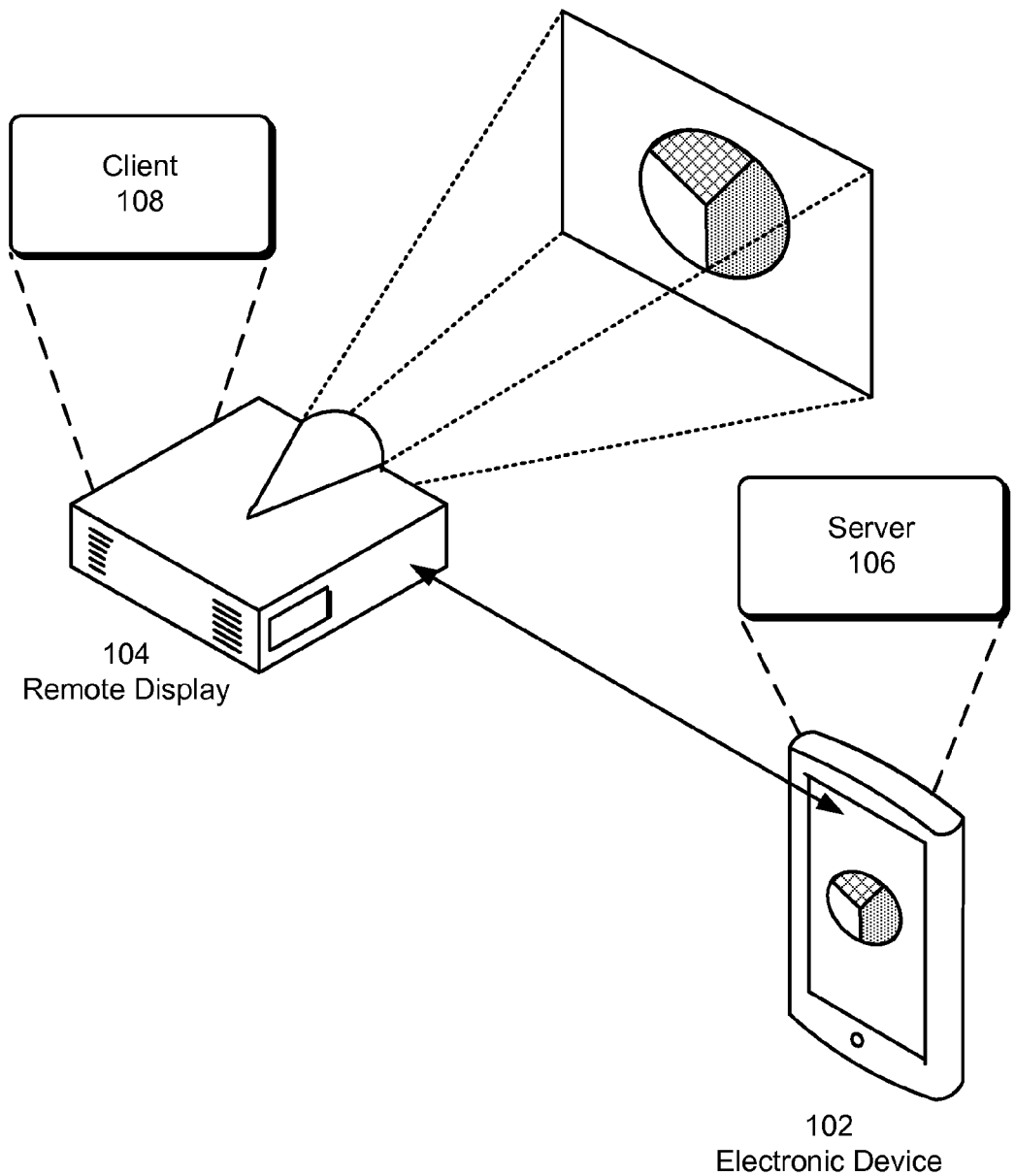
FIG. 1 shows a schematic of a system in accordance with an embodiment.

FIG. 1 shows a schematic of a system in accordance with an embodiment. The system includes an electronic device 102 and a remote display 104. Electronic device 102 may correspond to a mobile phone, tablet computer, personal digital assistant (PDA), portable media player, and/or other compact electronic device that includes functionality to store digital media such as documents, images, audio, and/or video. Remote display 104 may correspond to a projector, cathode ray tube (CRT) display, liquid crystal display (LCD), plasma display, organic light-emitting diode (OLED) display, surface-conducting electron-emitter display (SED), and/or other type of electronic display that is external to and/or larger than a display on electronic device 102.

In one or more embodiments, remote display 104 facilitates the sharing of digital media from electronic device 102. In particular, electronic device 102 may be used to drive remote display 104 so that graphical output on remote display 104 is substantially the same as graphical output on electronic device 102. For example, a user of electronic device 102 may control the display of a photo slideshow, presentation, and/or document on both remote display 104 and electronic device 102 from an application on electronic device 102. Because remote display 104 has a larger viewing area than the display on electronic device 102, remote display 104 may allow the photo slideshow, presentation, and/or document to be viewed by more people than if the photo slideshow, presentation, and/or document were displayed only on electronic device 102.

To enable the driving of remote display 104 from electronic device 102, a server 106 on electronic device 102 may be used to communicate with a client 108 on remote display 104. Server 106 may transmit graphical output from electronic device 102 to client 108, and client 108 may update remote display 104 with the graphical output. For example, server 106 and client 108 may correspond to a remote desktop server and remote desktop client that communicate over a network connection between electronic device 102 and remote display 104. The remote desktop server may propagate changes to the desktop and/or display of electronic device 102 to the remote desktop client, and the remote desktop client may update remote display 104 accordingly. In other words, server 106 and client 108 may allow electronic device 102 to drive remote display 104 without connecting to remote display 104 using a video interface such as Digital Visual Interface (DVI), High-Definition Multimedia Interface (HDMI), and/or DisplayPort.

However, the display of graphical output from electronic device 102 on remote display 104 may be adversely affected by bandwidth constraints between electronic device 102 and remote display 104. For example, a low-bandwidth wireless connection between electronic device 102 and remote display 104 may prevent electronic device 102 from transmitting full-resolution graphical output to remote display 104 at the frame rate used to update remote display 104. Instead, electronic device 102 may be required to reduce the frame rate and/or resolution of the graphical output transmitted to remote display 104. The reduced frame rate may increase the latency of updates to remote display 104, while the reduced resolution may decrease the level of detail in the graphical output used to update remote display 104. In other words, limited bandwidth between electronic device 102 and remote display 104 may detract from the viewability of graphical output from electronic device 102 on remote display 104.

In one or more embodiments, the system of FIG. 1 includes functionality to improve the viewing experience on remote display 104 by prioritizing transmission of the graphical output from electronic device 102 to remote display 104. First, electronic device 102 may obtain user input associated with a transition in graphical output on electronic device 102 and remote display 104. The transition may represent a change in the graphical output from a first frame and/or screen to a second frame and/or screen. For example, the transition may include a translation, a rotation, a scaling, and/or a fading effect between the first frame and/or screen and the second frame and/or screen. In addition, the user input may be used to trigger the transition. For example, the user input may include a tapping, swiping, pinching, and/or rotating gesture that is provided by a user of electronic device 102.

Next, electronic device 102 may identify a region of interest in remote display 104 based on the user input and a usage context associated with the graphical output. In particular, electronic device 102 may identify the transition based on the user input and usage context and obtain the region of interest as the portion of remote display 104 associated with the transition. For example, electronic device 102 may identify the portion of remote display 104 associated with the transition as an edge of remote display 104, a center of remote display 104, a border of remote display 104, and/or a block of pixels in remote display 104.

Electronic device 102 may then facilitate viewing of the transition on remote display 104 by prioritizing transmission of the graphical output from electronic device 102 to remote display 104 based on the region of interest. For example, electronic device 102 may transmit a first set of pixel values for the region of interest to remote display 104 prior to transmitting a second set of pixel values for a remainder of remote display 104 to remote display 104. In addition, the first set of pixel values may be associated with a higher resolution than the second set of pixel values. Consequently, electronic device 102 may improve the viewability of low-bandwidth graphical output on remote display 104 by emphasizing portions of remote display 104 that capture the attention and/or interest of users during transitions in the graphical output on electronic device 102 and remote display 104. Prioritization of graphical output from electronic device 102 to remote display 104 is discussed in further detail below with respect to FIG. 2.

Figure 2:
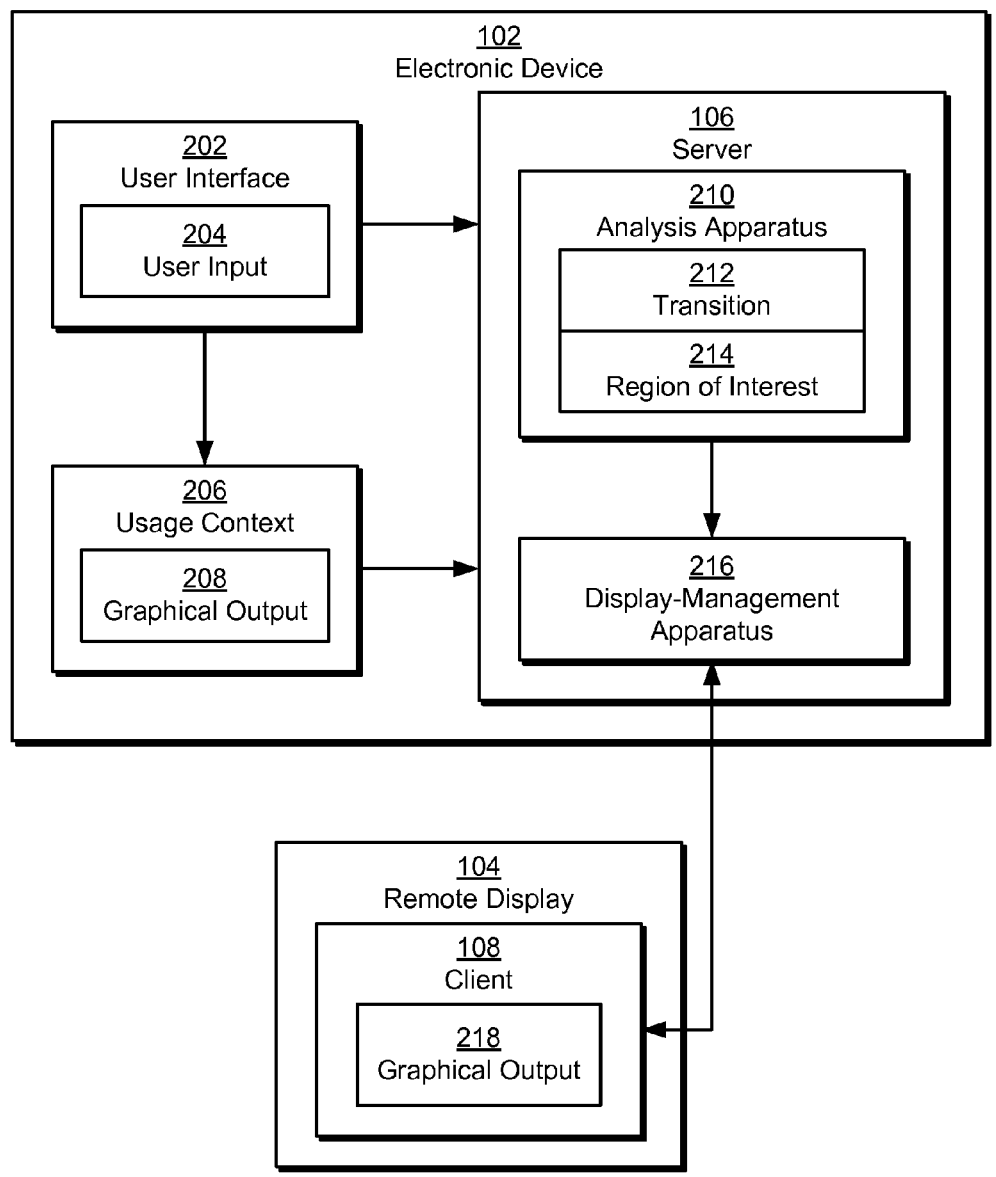
FIG. 2 shows the driving of a remote display from an electronic device in accordance with an embodiment.

FIG. 2 shows the driving of remote display 104 from electronic device 102 in accordance with an embodiment. As mentioned above, electronic device 102 may drive remote display 104 so that graphical output 208 on electronic device 102 is substantially the same as graphical output 218 on remote display 104. For example, electronic device 102 may enable the display of a presentation, photo slideshow, and/or document on both remote display 104 and the display of electronic device 102.

More specifically, server 106 may generate graphical output 218 based on graphical output 208 and transmit graphical output 218 to client 108 over a network (e.g., wireless network, local area network (LAN), wide area network (WAN), etc.) connection. Client 108 may then use graphical output 218 to update remote display 104. For example, server 106 and/or client 108 may provide a desktop- and/or screen-sharing application that allows the desktop and/or screen of electronic device 102 to be reproduced, in whole or in part, on remote display 104.

In addition, one or more components of electronic device 102 may facilitate the viewing of graphical output 218 on remote display 104, even if bandwidth between electronic device 102 and remote display 104 is constrained. First, user input 204 may be provided by a user through a user interface 202 (e.g., graphical user interface (GUI)) of electronic device 102. For example, the user may provide user input 204 by interacting with a touchscreen and/or touchpad in electronic device 102. As a result, user input 204 may correspond to a tapping gesture, a swiping gesture, a pinching gesture, and/or a rotating gesture.

Next, an analysis apparatus 210 associated with server 106 may identify a transition 212 associated with user input 204. Transition 212 may represent a change in graphical output 208 and 218 from a first frame and/or screen to a second frame and/or screen. For example, transition 212 may include a translation, a rotation, a scaling, and/or a fading effect between the first frame and/or screen and the second frame and/or screen. The translation may be associated with a swiping gesture, the rotation may be associated with a rotating gesture, the scaling may be associated with a pinching gesture, and the fading effect may be associated with a tapping gesture.

Because the same user input 204 may trigger different types of transitions associated with graphical output 208, analysis apparatus 210 may use both user input 204 and a usage context 206 associated with graphical output 208 to identify transition 212. For example, analysis apparatus 210 may obtain usage context 206 as the application and/or type of data used to generate graphical output 208 and user input 204 as a gesture provided by the user to the application. Analysis apparatus 210 may then identify transition 212 from a table containing a mapping of different types of user gestures to commands in the application.

Analysis apparatus 210 may also identify a region of interest 214 in remote display 104 based on user input 204 and usage context 206. In one or more embodiments, analysis apparatus 210 obtains region of interest 214 as the portion of remote display 104 associated with transition 212. For example, region of interest 214 may represent the portion of remote display 104 to which a user's attention and/or interest is directed during transition 212. As a result, region of interest 214 may include an edge of remote display 104 for a translation beginning at that edge and a center of remote display 104 for a rotation and/or scaling up of graphical output 208 and 218. Similarly, region of interest 214 may include a border of remote display 104 for a rotation and/or scaling down of graphical output 208 and 218 and one or more alternating blocks of pixels in remote display 104 for a fading effect in graphical output 208.

After transition 212 and region of interest 214 are identified by analysis apparatus 210, a display-management apparatus 216 associated with server 106 may prioritize the transmission of graphical output 218 to remote display 104 based on region of interest 214. In particular, display-management apparatus 216 may transmit a first set of pixel values for region of interest 214 to remote display 104 prior to transmitting a second set of pixel values for a remainder of remote display 104 to remote display 104. The earlier transmission of the first set of pixel values may allow client 108 to update region of interest 214 within remote display 104 as transition 212 is occurring so that transition 212 is noticeable to viewers of remote display 104.

In addition, the first set of pixel values may be associated with a higher resolution than the second set of pixels to improve the level of detail in the portion(s) of remote display 104 associated with transition 212. For example, during each frame of graphical output 208 and 218 associated with transition 212, display-management apparatus 216 may transmit the first set of pixels for region of interest 214 at full resolution and the second set of pixels for the remainder of remote display 104 at a fraction of the resolution of the first set of pixels. As a result, display-management apparatus 216 may emphasize changes to graphical output 218 that occur during transition 212, and in turn, improve the perceived latency and/or level of detail in remote display 104 for viewers of remote display 104.

In other words, analysis apparatus 210 and display-management apparatus 216 may anticipate transitions (e.g., transition 212) in graphical output 208 and 218 based on user input 204 and usage context 206 and prioritize the updating of regions of interest (e.g., region of interest 214) associated with the transitions in remote display 104 as the transitions occur. Such anticipation and prioritization may facilitate the use of remote display 104 in displaying digital media on electronic device 102, regardless of the type of digital media shown, the type of application used to display the digital media, and/or the available bandwidth between electronic device 102 and remote display 104.

Those skilled in the art will appreciate that the functionality of electronic device 102 may be used to facilitate the prioritization and transmission of graphical output in a variety of settings. For example, analysis apparatus 210 and display-management apparatus 216 may be used to prioritize the display of graphical output 208 on electronic device 102 based on the available bandwidth between electronic device 102 and a server computer providing a remote desktop for display on electronic device 102. Likewise, analysis apparatus 210 and display-management apparatus 216 may prioritize the transmission of multiple streams of graphical output from electronic device 102 to multiple remote displays based on the amount of bandwidth between electronic device 102 and each of the remote displays.

Figure 3:
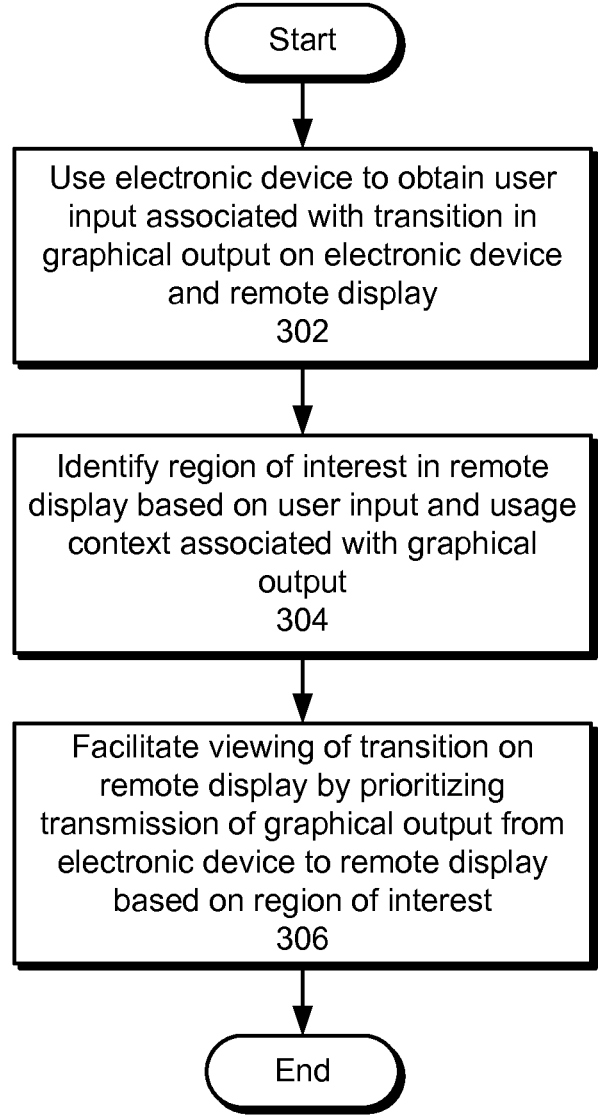
FIG. 3 shows a flowchart illustrating the process of driving a remote display from an electronic device in accordance with an embodiment.

FIG. 3 shows a flowchart illustrating the process of driving a remote display from an electronic device in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, the electronic device is used to obtain user input associated with a transition in graphical output on the electronic device and the remote display (operation 302). The user input may include a tapping gesture, a swiping gesture, a pinching gesture, and/or a rotating gesture. Similarly, the transition may correspond to a translation, a rotation, a scaling, and/or a fading effect.

Next, a region of interest is identified in the remote display based on the user input and a usage context associated with the graphical output (operation 304). The region of interest may be identified by identifying the transition based on the user input and the usage context and obtaining the region of interest as a portion of the remote display associated with the transition. The portion of the remote display may include an edge, a center, a border, and/or a block of pixels in the remote display.

Finally, viewing of the transition is facilitated on the remote display by prioritizing transmission of the graphical output from the electronic device to the remote display based on the region of interest (operation 306). The transmission of the graphical output may be prioritized by transmitting a first set of pixel values for the region of interest to the remote display prior to transmitting a second set of pixel values for a remainder of the remote display to the remote display. The first set of pixels may also be associated with a higher resolution than the second set of pixels.

Figure 4:
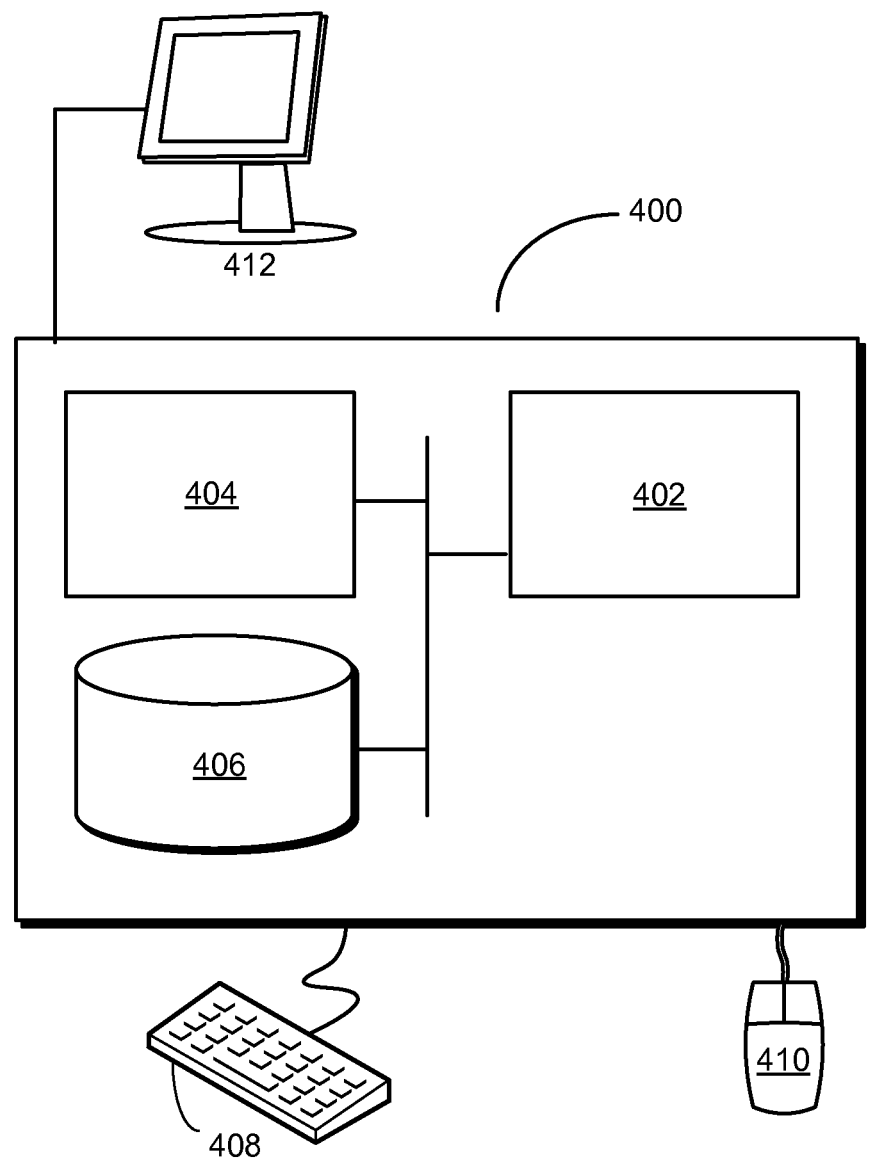
FIG. 4 shows a computer system in accordance with an embodiment.

FIG. 4 shows a computer system 400 in accordance with an embodiment. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for driving a remote display from an electronic device. The system may include an analysis apparatus that obtains user input associated with a transition in graphical output on the electronic device and the remote display. The analysis apparatus may also identify a region of interest in the remote display based on the user input and a usage context associated with the graphical output. The system may also include a display-management apparatus that facilitates viewing of the transition on the remote display by prioritizing transmission of the graphical output from the electronic device to the remote display based on the region of interest.

In addition, one or more components of computer system 400 may be remotely located and connected to the other components over a network. Portions of the present embodiments (e.g., analysis apparatus, display-management apparatus, etc.) may also be located on different nodes of a distributed system that implements the embodiments. For example, the present embodiments may be implemented using a cloud computing system that communicates with the electronic device using a network connection with the electronic device and displays graphical output from the electronic device on a set of remote displays.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for driving a remote display from an electronic device, comprising:
    receiving user input via a user input interface generated by the electronic device, wherein the user input is a touch gesture, the user input corresponding to a transition of a presentation application causing a change in graphical output generated by the electronic device and the graphical output transmitted from the electronic device to the remote display for display on the remote display;
    identifying, on the electronic device, if region of interest in graphical output to be displayed on the remote display based on the user input and a usage context associated with the graphical output;
    anticipating the transition based on the user input and usage context;
    prioritizing the updating of the region of interest associated with the transition in the remote display as the transitions occur;
        facilitating viewing of the transition on the remote display by prioritizing transmission of the graphical output from the electronic device to the remote display based on the region of interest; and
    transmitting a first set of pixels for the region of interest at a full resolution and a second set of pixels for the remainder of the remote display at a fraction of the resolution of the first set of pixels to emphasize the change to the graphical output during the transition.

2. The computer-implemented method of claim 1, wherein identifying the region of interest based on the user input and the usage context involves:
    identifying the transition based on the, user input and the usage context; and
    obtaining the region of interest as a portion of the remote display associated with the transition.

3. The computer-implemented method of claim 2, wherein the portion of the remote display is at least one of:
    an edge of the remote display;
    a center of the remote display;
    a border of the remote display; and
    a block of pixels in the remote display.

4. The computer-implemented method of claim 1, wherein the transition corresponds to at least one of a translation, a rotation, a scaling, and a fading effect.

5. The computer-implemented method of claim 1, wherein the user input is at least one of a tapping gesture, a swiping gesture, a pinching gesture, and a rotating gesture.

6. The computer-implemented method of claim 1, wherein prioritizing transmission of the graphical output from the electronic device to the remote display based on the region of interest involves:
    transmitting a first set of pixel values for the region of interest to the remote display prior to transmitting a second set of pixel values for a remainder of the remote display to the remote display.

7. The computer-implemented method of claim 6, wherein the first set of pixel values is associated with a higher resolution than the second set of pixels.

8. The computer-implemented method of claim 1, wherein the electronic device is at least one of a mobile phone, a tablet computer, a personal digital assistant (PDA), and a portable media player.

9. A system for driving a remote display from an electronic device, comprising:
    a computer processor implemented analysis apparatus configured to:

obtain user input from a user input interface hosted by the electronic device, wherein the user input is a touch gesture, the user input corresponding to a transition of a presentation application causing a change in graphical output generated by the electronic device and the graphical output transmitted from the electronic device to the remote display for display on the remote display; and identify a region of interest in graphical output to be displayed on the remote display based on the user input and a usage context associated with the graphical output;

anticipate the transition based on the user input and usage context;

prioritize the updating of the region of interest associated with the transition in the remote display as the transitions occur;

a computer processor implemented display-management apparatus configured to facilitate viewing of the transition on the remote display by prioritizing transmission of the graphical output from the electronic device to the remote display based on the region of interest; and transmitting a first set of pixels for the region of interest at a full resolution and a second set of pixels for the remainder of the remote display at a fraction of the resolution of the first set of pixels to emphasize the change to the graphical output during the transition.

10. The system of claim 9, wherein identifying the region of interest based on the user input and the usage context involves:

identifying the transition based on the user input and the usage context; and obtaining the region of interest as a portion of the remote display associated with the transition.

11. The system of claim 10, wherein the portion of the remote display is at east one of:

an edge of the remote display;
a center of the remote display;
a border of the remote display; and
a block of pixels in the remote display.

12. The system of claim 9, wherein the transition corresponds to at least one of a translation, a rotation, a scaling, and a fading effect.

13. The system of claim 9, wherein the user input is at least one of a tapping gesture, a swiping gesture, a pinching gesture, and a rotating gesture.

14. The system of claim 9, wherein prioritizing transmission of the graphical output from the electronic device to the remote display based on the region of interest involves:

transmitting a first set of pixel values for the region of interest to the remote display prior to transmitting a second set of pixel values for a remainder of the remote display to the remote display.

15. The system of claim 14, wherein the first set of pixel values is associated with a higher resolution than the second set of pixels.

16. A non-transitory computer-readable storage medium storing instructions that when executed by an electronic device cause the electronic device to perform operations to drive a remote display from the electronic device, the operations comprising:

receiving user input via a graphic user input interface generated by the electronic device, wherein the user input is a touch gesture, the user input corresponding to a transition of a presentation application causing a change in graphical output generated by the electronic device and the graphical output transmitted from the electronic device for display on the remote display;

identifying, on the electronic device, a region of interest in graphical output to be displayed on the remote display based on the user input and a usage context associated with the graphical output;

anticipating the transition based on the user input and usage context;

prioritizing the updating of the region of interest associated with the transition in the remote display as the transitions occur;

facilitating viewing of the transition on the remote display by prioritizing transmission of the graphical output from the electronic device to the remote display based on the region of interest; and transmitting a first set of pixels for the region of interest at a full resolution and a second set of pixels for the remainder of the remote display at a fraction of the resolution of the first set of pixels to emphasize the change to the graphical output during the transition.

17. The non-transitory computer-readable storage medium of claim 16, wherein identifying the region of interest based on the user input and the usage context involves:

identifying the transition based on the user input and the usage context; and obtaining the region of interest as a portion of the remote display associated with the transition.

18. The non-transitory computer-readable storage medium of claim 17, wherein the portion of the remote display is at least one of:

an edge of the remote display;
a center of the remote display;
a border of the remote display; and
a block of pixels in the remote display.

19. The non-transitory computer-readable storage medium of claim 16, wherein the transition corresponds to at least one of a translation, a rotation, a scaling, and a fading effect.

20. The non-transitory computer-readable storage medium of claim 16, wherein the user input is at least one of a tapping gesture, a swiping gesture, a pinching gesture, and a rotating gesture.

21. The non-transitory computer-readable storage medium of claim 16, wherein prioritizing transmission of the graphical output from the electronic device to the remote display based on the region of interest involves:

transmitting a first set of pixel values for the region of interest to the remote display prior transmitting a second set of pixel values for a remainder of the remote display to the remote display.

22. The non-transitory computer-readable storage medium of claim 21, wherein the first set of pixel values is associated with a higher resolution than the second set of pixels.

23. An electronic device, comprising:

a server operating within the electronic device, the server configured to transmit graphical output to a remote display, wherein the graphical output is used to drive the remote display;

an analysis apparatus operating within the electronic device, the analysis apparatus configured to:

receive user input via a user interface generated by the electronic device, wherein the user input is a touch gesture, the user input corresponding to a transition of a presentation application causing a change in graphical output generated by the electronic device and the graphic output transmitted from the electronic device to the remote display for display on the remote display; and identify a region of interest in the graphical output to be displayed on the remote display based on the user input and a usage context associated with the graphical output;

anticipate the transition based on the user input and usage context;

prioritize the updating of the region of interest associated with the transition in the remote display as the transitions occur;

a display-management apparatus configured to facilitate vie wing of the transition on the remote display by prioritizing transmission of the graphical output from the electronic device to the remote display based on the region of interest; and transmitting a first set of pixels for the region of interest at a full resolution and a second set of pixels for the remainder of the remote display at a fraction of the resolution of the first set of pixels to emphasize the change to the graphical output during the transition.

24. The electronic device of claim 23, wherein identifying the region of interest based on the user input and the usage context involves:

identifying the transition based on the user input and the usage context; and obtaining the region of interest as a portion of the remote display associated with the transition.

25. The electronic device of claim 23, wherein prioritizing transmission of the graphical output from the electronic device to the remote display based on the region of interest involves:

transmitting a first set of pixel values for the region of interest to the remote display prior to transmitting a second set of pixel values for a remainder of the remote display to the remote display.

26. A computer-implemented method comprising:

receiving, on an electronic device via a user interface generated by the electronic device, a first user input corresponding to a transition of a presentation application causing a change in content, wherein the first user input is a touch gesture, the content to be transmitted from the electronic device to the remote display for display on a remote display device;

generating, in response to the first user input, a region of interest bounding a portion of the content to be displayed on the remote display based at least in part on the first user input and a usage context associated with the content;

anticipating the transition based on the user input and usage context;

prioritizing the updating of the region of interest associated with the transition in the remote display as the transitions occur;

transmitting, from the electronic device, a first portion of the content corresponding to the region of interest to the remote display; and transmitting, from the electronic device and in conjunction with the first portion, a second portion of the content corresponding to content outside the region of interest; and transmitting a first set of pixels for the region of interest at a full resolution and a second set of pixels for the remainder of the remote display at a fraction of the resolution of the first set of pixels to emphasize the change to the graphical output during the transition.

* * * * *